United States Patent [19]
Yoon

[11] Patent Number: 5,978,589
[45] Date of Patent: Nov. 2, 1999

[54] LOADING METHOD OF BASE STATION SYSTEM IN DIGITAL CELLULAR SYSTEM

[75] Inventor: Chan-Ho Yoon, Seoul, Rep. of Korea

[73] Assignee: SamSung Electronics Co., Ltd., Kyungki-do, Rep. of Korea

[21] Appl. No.: 08/781,976

[22] Filed: Dec. 27, 1996

[30] Foreign Application Priority Data

Dec. 30, 1995 [KR] Rep. of Korea ...................... 95-67835

[51] Int. Cl.$^6$ ................................ G06F 9/00; H04B 7/00
[52] U.S. Cl. .................... 395/712; 395/652; 395/200.52; 395/200.74; 395/200.33; 455/514; 455/507; 455/500; 370/428
[58] Field of Search ........................ 395/200.33, 200.47, 395/200.48, 200.49, 200.51, 200.52, 200.62, 200.68, 200.74, 562, 561, 563; 455/561, 507, 514, 500, 560; 370/428, 429, 351

[56] References Cited

U.S. PATENT DOCUMENTS

| | | | |
|---|---|---|---|
| 4,319,338 | 3/1982 | Grudowski et al. ...................... | 395/289 |
| 4,908,828 | 3/1990 | Tikalsky .................................. | 371/69.1 |
| 5,185,866 | 2/1993 | Francisco ................................. | 395/280 |
| 5,337,344 | 8/1994 | Alvesalo ................................... | 455/403 |
| 5,475,818 | 12/1995 | Molyneaux et al. ............... | 395/200.38 |
| 5,481,588 | 1/1996 | Ricli et al. ................................. | 379/32 |
| 5,553,083 | 9/1996 | Miller ........................................ | 371/32 |
| 5,557,654 | 9/1996 | Mäenpää ............................... | 455/411 |
| 5,559,933 | 9/1996 | Boswell .................................. | 395/114 |
| 5,706,431 | 1/1998 | Otto .................................. | 395/200.51 |
| 5,727,002 | 3/1998 | Miller et al. ............................. | 371/32 |

Primary Examiner—Tariq R. Hafiz
Assistant Examiner—Tuan Q. Dam
Attorney, Agent, or Firm—Robert E. Bushnell, Esq.

[57] ABSTRACT

A loading method of a base station system in a digital cellular system. The loading method run in its own processor includes the steps of: requesting its upper processor to load a file, receiving a file header from the upper processor, and assigning a storage area corresponding to a size of the file header; transmitting a receiving completion signal indicating that the file header has been received to the upper processor, receiving file data from the upper processor, and storing the file data in the storage area; checking whether all the file data corresponding to the file size has been received; and if all the file data has been received, performing an operation by use of the file data received to run loading in its own processor.

7 Claims, 4 Drawing Sheets

LOADING METHOD OF BASE STATION SYSTEM IN DIGITAL CELLULAR SYSTEM

BACKGROUND OF THE INVENTION

1. Field of the Invention

The present invention relates to a digital cellular system and, more particularly, to a loading method of a base station system for performing system loading within a fast time from the base station system.

2. Description of the Related Art

A base station of a digital cellular system is a load distributed control system consisting of a plurality of processors. The load distributed control system has independently operated processors which are distinguished from one another according to each function. It is system loading that causes the distributed processors to perform a normal function by loading a corresponding program and data. In loading an entire system, a conventional loading structure includes a master processor 2 which takes charge of loading, as shown in FIG. 1. If a loading request is received from processors 4, the master processor 2 runs the loading by reading a file of a corresponding processor from a hard disk 6.

However, if there are a large number of processors to be loaded, the master processor is subject to overload. Moreover, it takes a long time to load the processors since the master processor loads all the processors of the entire system. If there is an obstacle to the master processor, lower processors can not be loaded.

SUMMARY OF THE INVENTION

It is therefore an object of the present invention to provide a method for reducing a time needed to normally load and operate an entire system even if there are a large number of processors by improving a loading method of a base station system in a digital cellular system.

It is another object of the present invention to provide a method which has a little effect on the loading of a lower processor even if a master processor of a base station system in a digital cellular system is in abnormal operation.

According to the present invention, a loading method run in its own processor of a base station in a digital cellular system includes the steps of: requesting its upper processor to load a file, receiving a file header from the upper processor, and assigning a storage area corresponding to a size of the file header; transmitting a receiving completion signal indicating that the file header has been received to the upper processor, receiving file data from the upper processor, and storing the file data in the storage area; checking whether all the file data corresponding to the file size has been received; and if all the file data has been received, performing an operation by use of the file data received to run loading in its own processor.

DETAILED DESCRIPTION OF THE PREFERRED EMBODIMENT

A digital mobile communication system consists of a BSS (base station subsystem), a MSC (mobile switching center) and a HLR (home location register).

Figure 1:
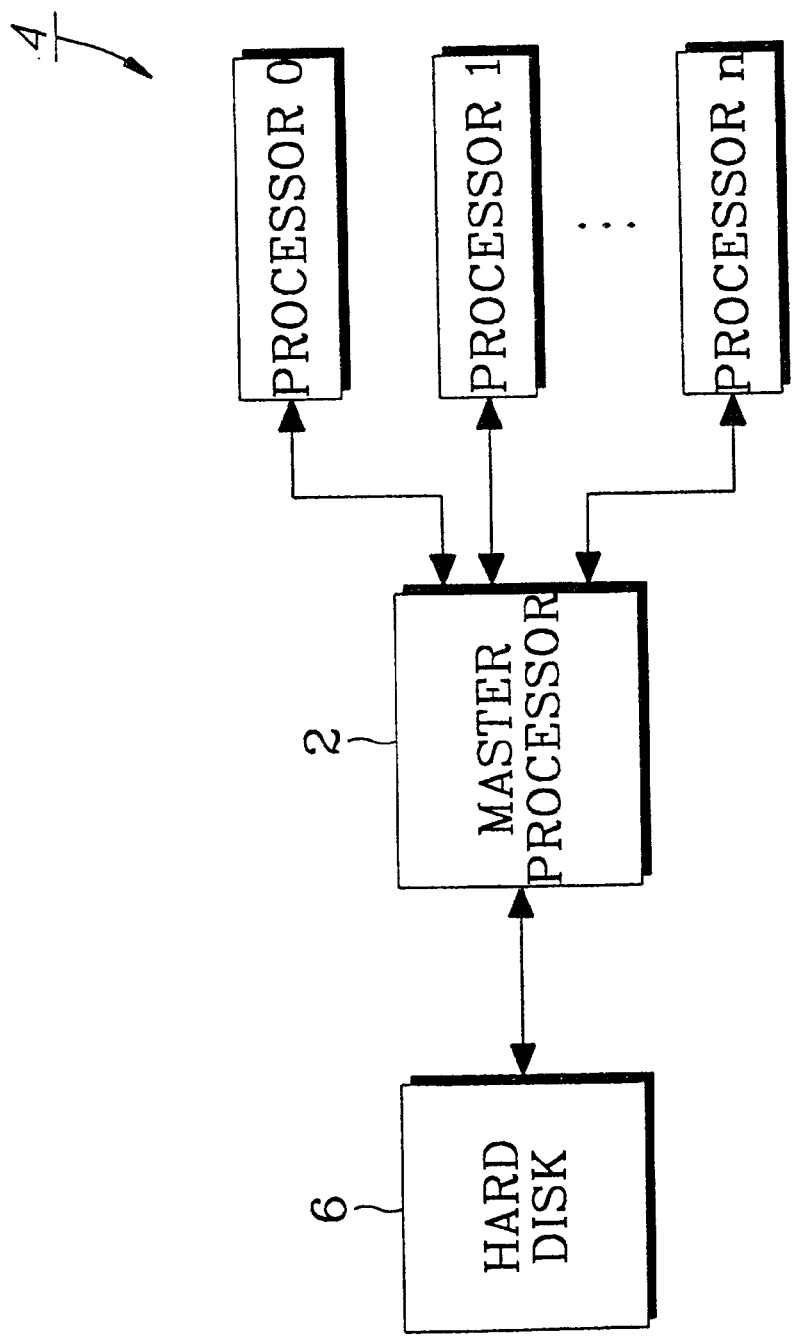
FIG. 1 is a block diagram showing a conventional loading structure.
Figure 2:
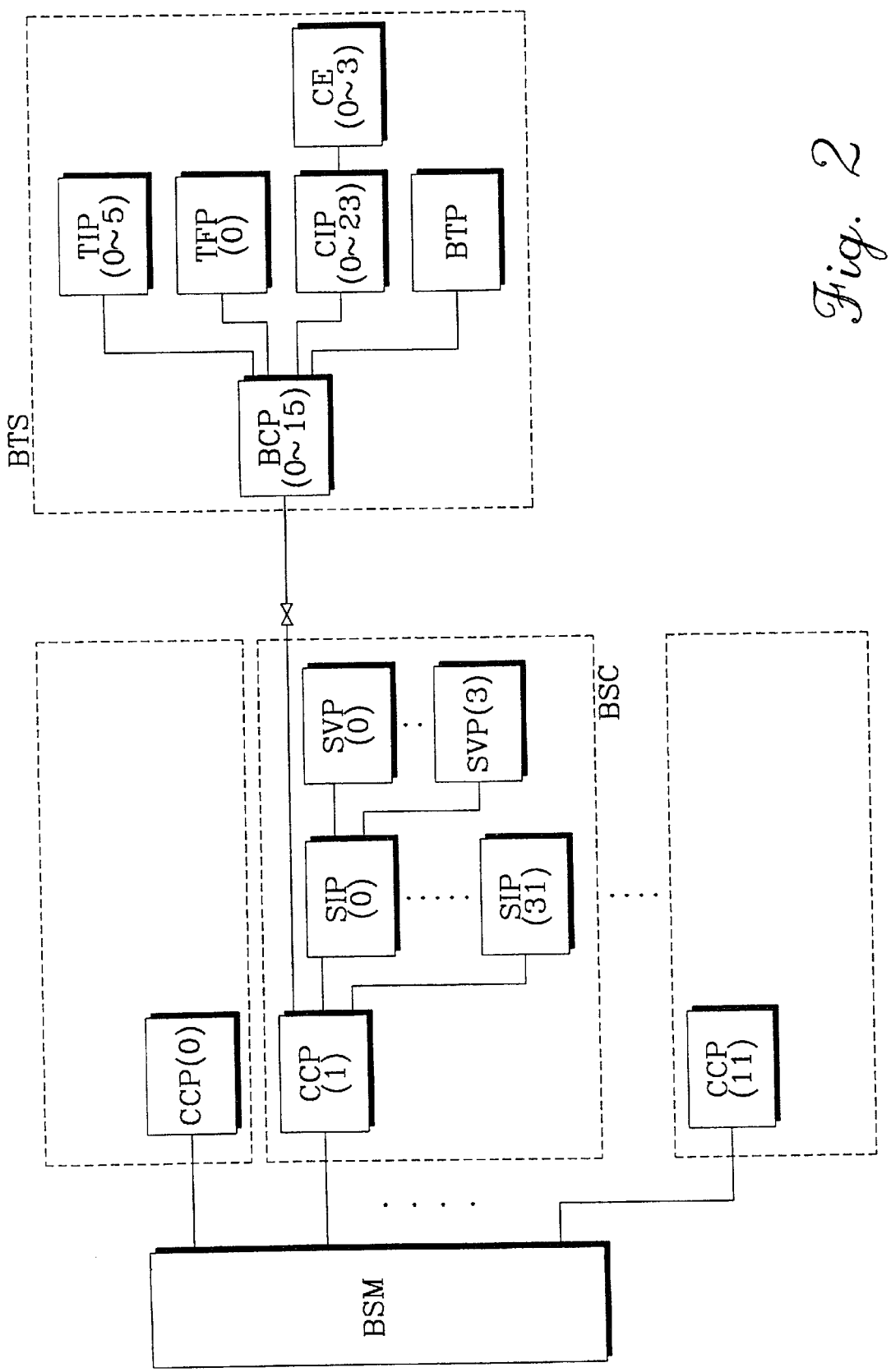
FIG. 2 is a block diagram showing a loading structure of a base station system in a digital cellular system according to the present invention.

The BSS includes, as indicated in FIG. 2, a BSM (base station management), a BSC (base station controller) and a BTS (base station transceiver subsystem).

The loading structure of the BSS will now be described with reference to FIG. 2. There is one BSM in an entire system of the BSS. The BSM is constructed with a workstation and takes charge of the loading of a CCP (call control processor). There are a maximum of 12 CCPs per BSS. One CCP is in charge of the loading of a maximum of 32 SIPs (selector interface processors) and 16 BCPs (BTS control processors). There are a maximum of 384 SIPs per BSS. One SIP is in charge of the loading of a maximum of 4 SVPs (selector vocoder processors). There are a maximum of 192 BCPs per BSS. One BCP takes charge of the loading of a maximum of 24 CIPs, (channel card interface processors) and CEs (channel elements) one BTP (BTS test processor), 6 pairs of TIPs (transceiver interface processors) and a pair of TFPs (timing and frequency processors).

The loading of the BSS is a multidrop loading system classified into upper, middle and lower processors according to a layer. The multidrop loading system distinguishes the processors from one another according to the layer or level. An upper processor performs the loading to a middle processor. In the middle processor, a file to be run therein is loaded from the upper processor and is run in the middle processor. Further, while application layers are run, the file to be loaded to a lower processor is loaded in the middle processor. Only a file to be run in the lower processor is then loaded from the middle processor. If a power source is applied by hardware, the processor is initialized, and a program and data are loaded from its upper processor.

Figure 3:
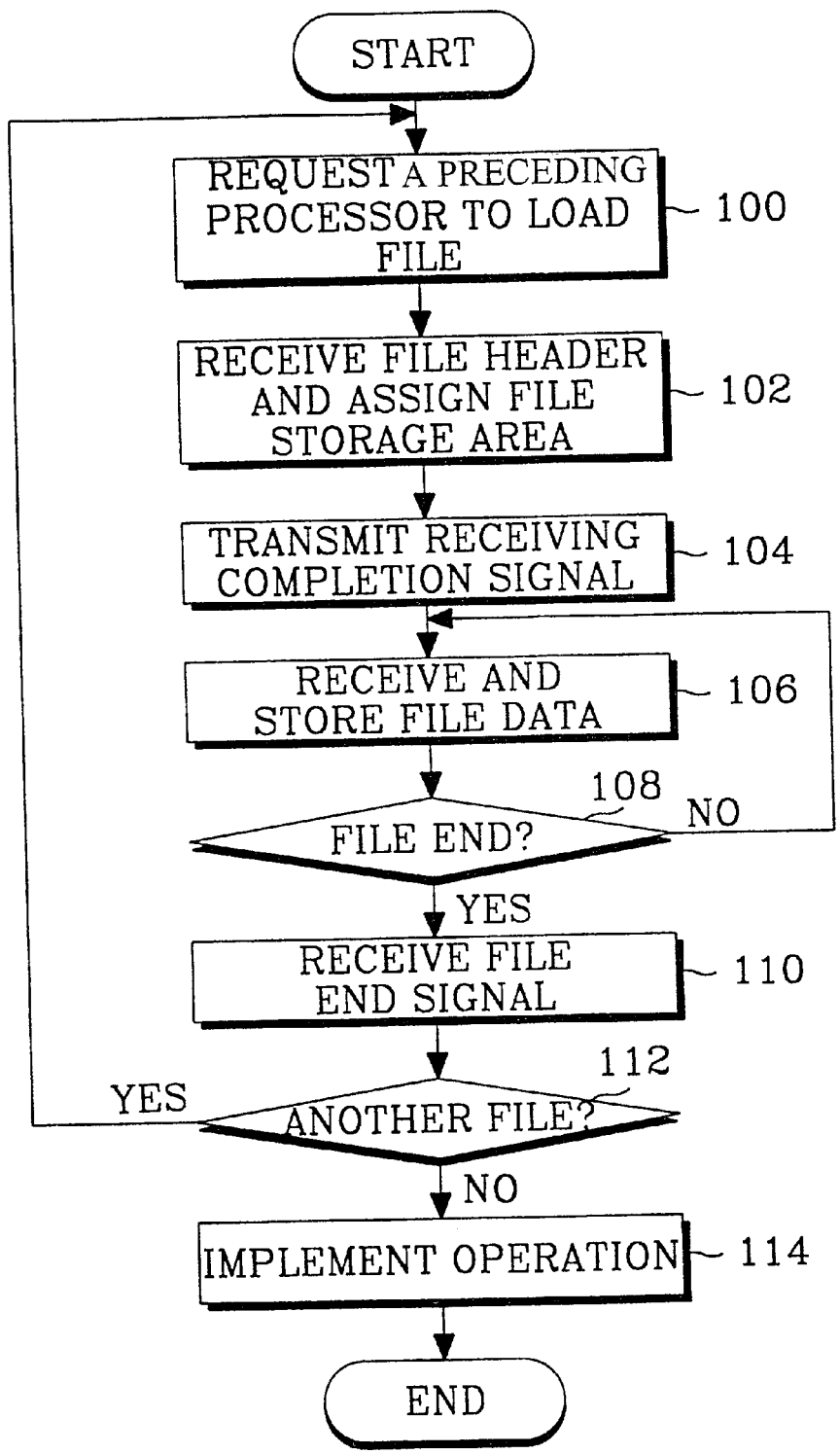
FIG. 3 is a flow chart showing file loading run in its own processor according to the present invention.

FIG. 3 shows a file loading control flow. At step 100, a processor requests a preceding processor to load a file. At step 102, the processor receives a file header from a preceding processor and assigns a storage area corresponding to a size of the file header. At step 104, the processor transmits a receiving completion signal indicating that the file header has been received processor. Then the preceding processor transmits file data. At step 106, the processor receives and stores the file data. At step 108, the processor checks whether the downloading of the file is completed by checking the file size. If the file completer, the processor continues to receive the file data. If the file is ended, that is, if all the data corresponding to the file size is received from the preceding processor, the processor receives, at step 110, a file end signal. The processor checks, at step 112, whether there is another file. If there is any file, the processor continues to request the preceding processor to load another file. If there is no additional file, the processor, at step 114, proceeds to operate in response to the files it has loaded therein.

Figure 4:
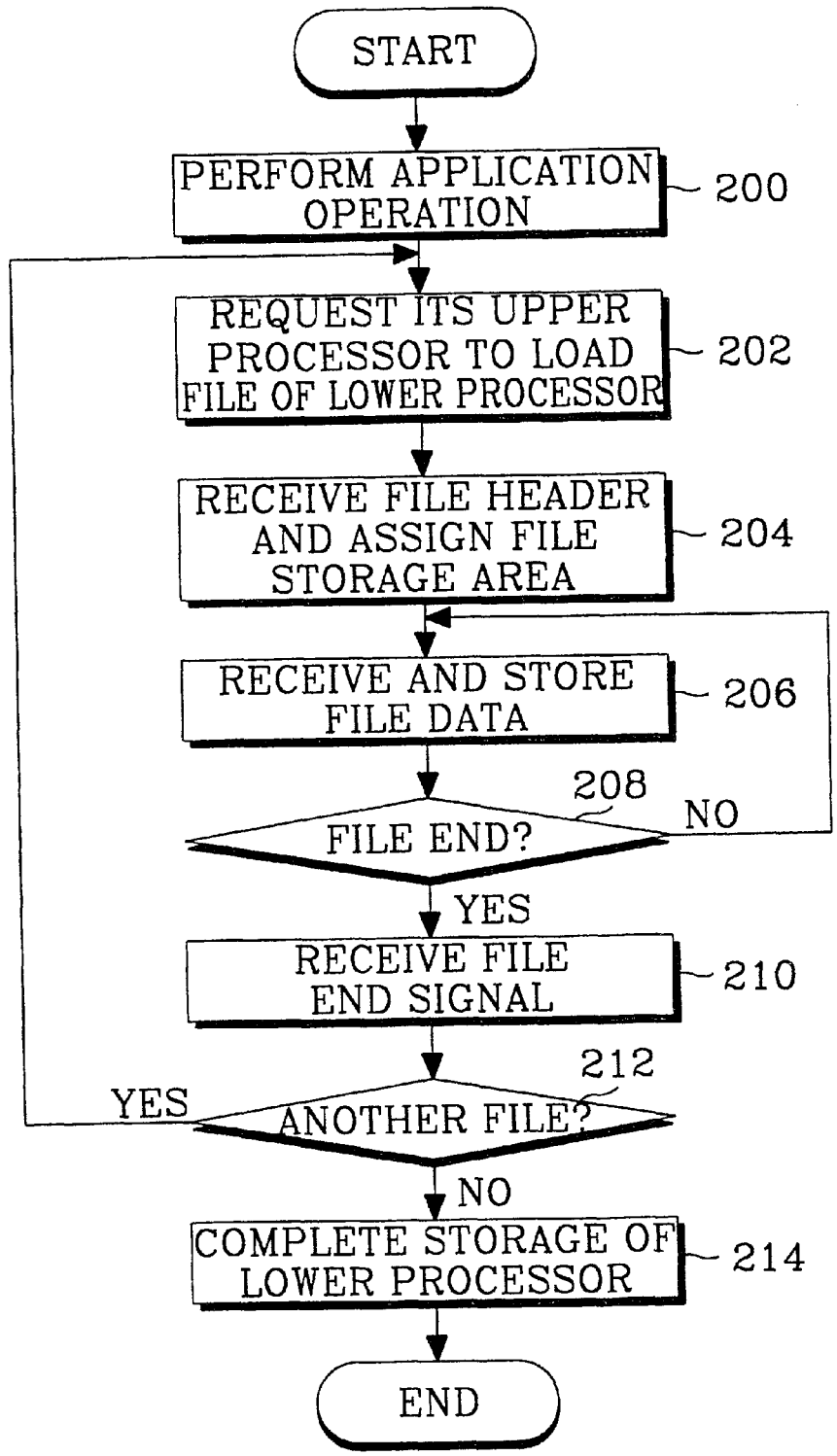
FIG. 4 is a flow chart showing a process for storing a file to be loaded to a lower processor after a middle processor receives all files corresponding to its own processor according to the present invention.

Referring to FIG. 4, there is shown a process for storing the file to be loaded to the lower processor after the middle processor receives all its corresponding files from the upper processor. At step 200, a middle processor performs an application operation. At step 202, the middle processor requests the upper processor to load a file corresponding to a lower processor. At step 204, the middle processor receives the file header from the upper processor and assigns the storage area corresponding to the size of the file header. At step 206, the middle processor receives the file data from the upper processor and stores the file data. At step 208, the middle processor checks whether the file downloading is completer by checking the file size. If the complete file is not stored, middle processor continues to receive and store additional file data. If the complete file is received that is, if all the data corresponding to the file size is received from the upper processor, the middle processor receives, at step 210, a file end signal. The middle processor checks, at step 212, whether there is another file for the lower processor to be downloaded. If there is another file, the middle processor requests the upper processor to download the file. If there is no additional file, the middle processor downloads, at step 214, the corresponding files to the lower processor. Therefore, all the file loading in the middle processor is ended.

As described above, the present invention has the following advantages. First, a loading time can be reduced by utilizing a multidrop loading method using a hierarchy structure when loading a plurality of processors. Second, it is possible to independently distribute loading between layers. Third, the processors can be effectively used.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A multidrop loading system processor loading method for a base station of a digital cellular system, comprising the steps of:

requesting from a preceding level processor to load a file in a processor, receiving a file header from the preceding level processor, and assigning a storage area in the processor corresponding to a size indicated by said file header;

transmitting by the processor a receipt complete signal to the preceding level processor, indicating that said file header has been received by the processor, receiving in the processor file data from the preceding level processor, and storing the file data in said storage area in the processor;

checking whether all the file data from the preceding level processor has been received by the processor; and proceeding to operate the processor in response to the file data received from the preceding level processor loaded in the processor.

2. The method as claimed in claim 1, further comprising checking whether all the file data has been received by the processor and checking whether there is another file to be received from said preceding level processor.

3. A multidrop loading method for storing a file to be loaded in a base station of a digital cellular system, said method comprising the steps of:

requesting an upper level processor to load a file of a corresponding lower level processor;

receiving by a middle level processor a file header from upper level processor, and assigning in the middle level processor an application area corresponding to a size of said file header;

storing in the middle level processor a program and data from the upper level processor;

checking whether all the program and the data corresponding to the assigned application area have been received by the middle level processor;

receiving by the lower level processor the program and data from the middle level processor; and completing the storage of the program and the data received from the middle level processor in the lower level processor.

4. The method as claimed in claim 3, further comprising checking whether all the program and the data have been received by the lower level processor and checking whether there is another program and data to be received by the lower level processor.

5. A method of loading a file in a processor in a multidrop loading system, comprising the steps of:

requesting a first level processor to load a first file into a second level processor, said first file being operable in said second level processor;

transmitting a first file header from said first level processor to said second level processor in response to requesting said first level processor to load the first file into said second level processor;

assigning a storage area in said second level processor of a size indicated by said first file header;

transmitting a first receiving completion signal from said second level processor to said first level processor, said first receiving completion signal indicating that said first file header has been received by said second level processor;

transmitting file data corresponding to said first file from said first level processor to said second level processor in response to receiving said first receiving completion signal;

storing said file data corresponding to said first file in said storage area in said second level processor;

determining whether all the file data corresponding to said first file has been received by said second level processor; and operating said second level processor in response to said storing of said file data corresponding to said first file in said storage area of said second level processor.

6. The method of claim 5, further comprising the steps of:

requesting said first level processor to load a second file for operation in a third level processor into said second level processor;

transmitting a second file header from said first level processor to said second level processor in response to requesting said first level processor to load the second file for operation in said third level processor into said second level processor;

assigning a second storage area in said second level processor of a size indicated by said second file header;

transmitting a second receiving completion signal from said second level processor to said first level processor indicating that said second file header has been received by said second level processor from said first level processor;

transmitting file data corresponding to said second file from said first level processor to said second level processor in response to transmitting said second receiving completion signal by said second level processor to said first level processor;

storing said file data corresponding to said second file in said second storage area in said second level processor;

determining whether all the file data corresponding to the second file has been received by said second level processor;

transmitting said file data corresponding to said second file from said second level processor to said third level processor; and operating said third level processor in response to said transmitting said file data corresponding to said second file from said second level processor to said third level processor.

7. A multidrop downloading system, comprising:

a first level processor having a plurality of files stored therein;

a second level processor that can request the transfer of at least one of said plurality of files from said first level processor and proceed to operate in response to receiving said at least one of said plurality of files from said first level processor; and a third level processor that can request the transfer of at least one of said plurality of files from said first level processor via said second level processor and proceed to operate in response to receiving said at least one of said plurality of files received via said second level processor.

* * * * *